Patented Apr. 23, 1940

2,198,220

UNITED STATES PATENT OFFICE 2,198,220

STABILIZED NUT BUTTER

Sidney Musher, New York, N. Y., assignor to Musher Foundation Incorporated, New York, N. Y., a corporation of New York No Drawing. Application October 28, 1939, Serial No. 301,759

3 Claims. (Cl. 99—128)

This application relates to an improved method for retarding deterioration and rancidity in peanut butter.

An object of this invention is to retard deterioration of peanut butter without requiring any change in labeling or the addition of foreign substances while at the same time improving the keeping quality of the peanut butter so as to enable the product to meet with more favorable acceptance and utilization even under conditions of distribution during summer temperatures or under conditions that would normally result in the development of rancidity.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, there is combined with the peanut butter made by macerating roasted peanuts approximately 25% or desirably less down to about 3% of macerated nut paste obtained from unroasted peanuts, preferably dried without roasting to under 10% moisture.

For example, unroasted peanuts may be subjected to a grinding or macerating operation in order to produce a macerated oily paste such as by subjecting the peanuts to a rolling or milling operation between metal or cement discs to obtain the nut butter of unroasted peanuts.

The peanuts are desirably first dried by heating to temperatures insufficient to produce a roasted flavor and under about 220° F. until the moisture content of the peanuts is reduced to under 10% and preferably to under 7%.

This butter is then combined and thoroughly admixed with the nut butter obtained from peanuts which are roasted at temperatures in excess of about 250° F. and frequently as high as 300° F. to 450° F. in an amount of between about 3% and 25% and the resultant peanut butter obtained is substantially stabilized against oxidative deterioration.

Where desired, the roasted peanuts and the ordinary unroasted peanuts may be combined before grinding in their proper proportion such as by utilizing 85% of roasted peanuts and 15% of unroasted peanuts, and then the mixture of the two grades of peanuts subjected to the rolling or macerating process to produce the peanut butter.

The peanut butter that is obtained by the blending or admixture of the unroasted peanuts and the roasted peanuts is very materially improved in keeping quality and the development of off-flavors due to rancidity and oxidation of the oil is markedly retarded.

Where desired, the roasted portion of the peanuts may be slightly over-roasted in order that the paste produced by blending the paste of the unroasted peanuts with that of the roasted peanuts should have more nearly the desirable roasted flavor characteristics of the paste produced from entirely roasted peanuts.

Example

Virginia peanuts were shelled, the skins removed and roasted at about 300° F. for about 50 minutes. The roasted peanuts were then converted to a paste by grinding between cement discs. Another lot of Virginia peanuts was shelled, the skins removed and the peanuts dried at about 215° F. for 20 minutes to about 8% moisture content. The unroasted peanuts were then converted to a paste by grinding as above. A mixture was prepared comprising 90% of the paste from the roasted peanuts with 10% of the paste from the unroasted peanuts and the peanut butter thus prepared was compared in keeping quality with the paste made from 100% roasted peanuts. It was observed that the paste made containing the paste from the unroasted peanuts kept for about 50% longer than the paste made from 100% roasted peanuts upon storage at room temperature in glass jar containers.

This application is a continuation in part of application, Serial No. 102,631, filed September 25, 1936.

Having described my invention, what I claim is:

1. A stabilized oily paste composed of ground roasted peanuts and a small proportion, less than 25%, of ground unroasted peanuts.

2. A method of producing a stabilized peanut butter preparation which comprises combining the oily paste obtained from grinding roasted peanuts with a relatively small proportion of the oily paste obtained from grinding unroasted peanuts.

3. A method of producing a stabilized peanut butter preparation which comprises grinding into paste form roasted peanuts with a relatively small proportion of unroasted peanuts.

SIDNEY MUSHER.